July 6, 1965　　　J. P. DESJARDINS　　　3,193,645
MAGNETIC CONTROL DEVICE
Filed May 17, 1962
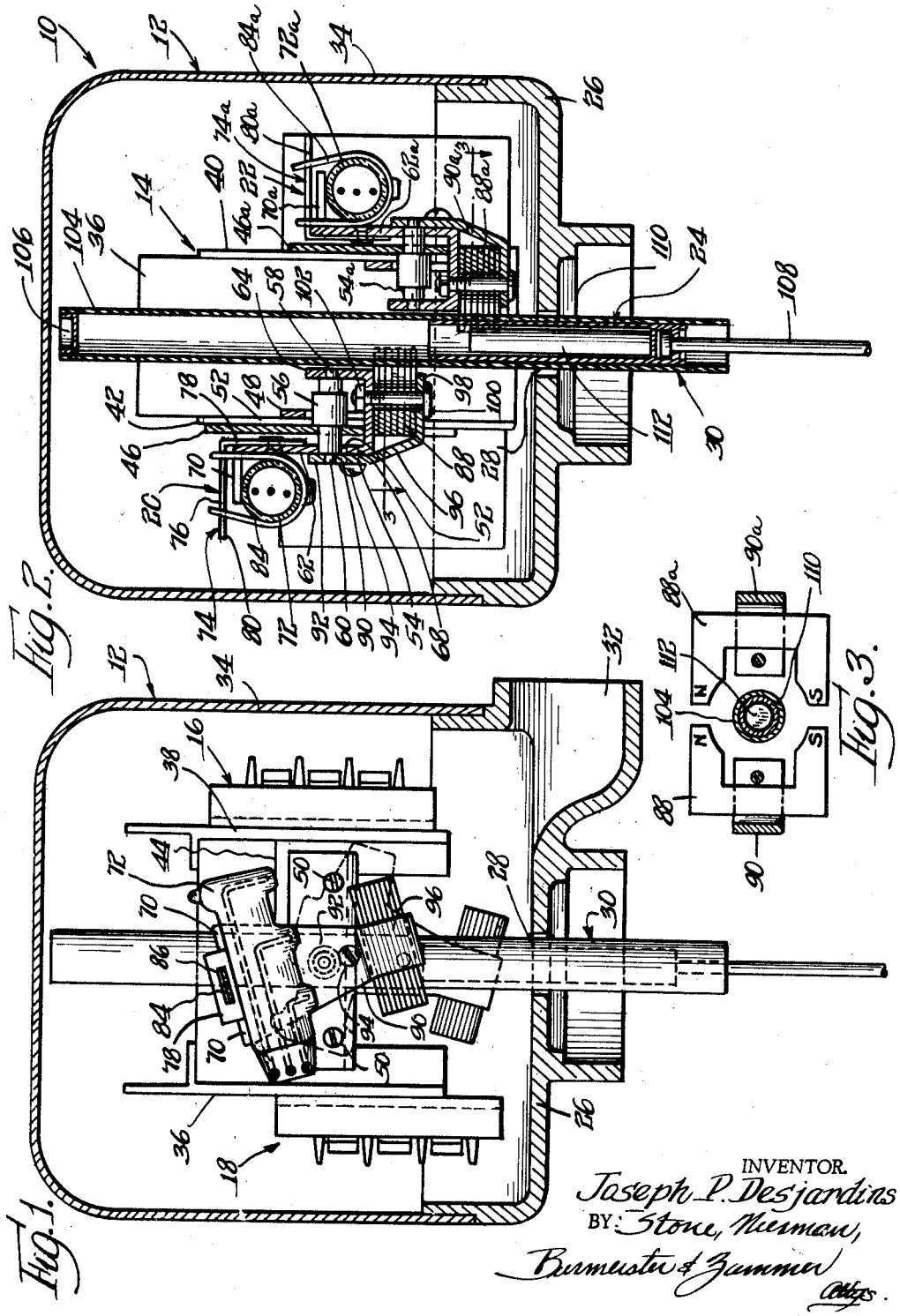
INVENTOR.
Joseph P. Desjardins
BY Stone, Neuman,
Burmeister & Zimmer
Attys.

July 6, 1965   J. P. DESJARDINS   3,193,645
MAGNETIC CONTROL DEVICE
Filed May 17, 1962   2 Sheets-Sheet 2
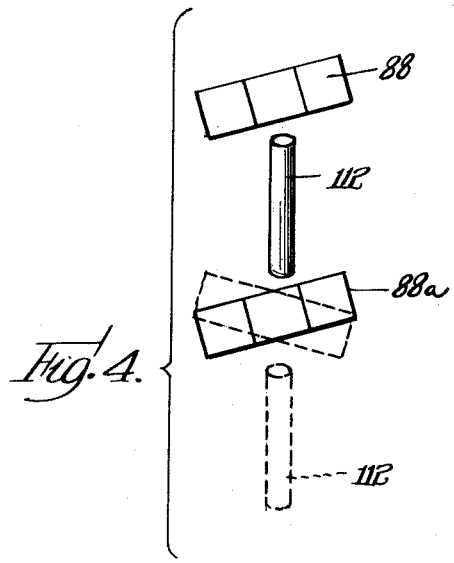
Fig. 4.
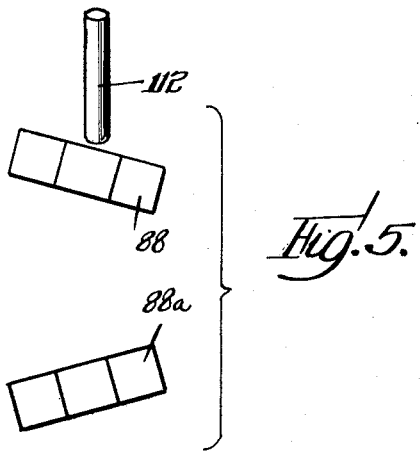
Fig. 5.
Fig. 6.
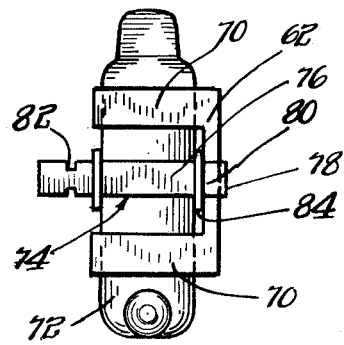
Fig. 7.
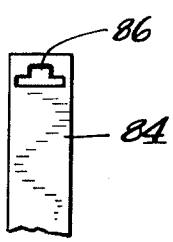
INVENTOR.
Joseph P. Desjardins
BY Stone, Nierman,
Burmeister & Zummer
attys ID: 3,193,645
Patented July 6, 1965

1

3,193,645
MAGNETIC CONTROL DEVICE
Joseph P. Desjardins, 9147 Juniper Ave., Gary, Ind.
Filed May 17, 1962, Ser. No. 195,518
11 Claims. (Cl. 200—112)

This invention relates to an improved construction of an electrical device, and more specifically to a control device which is operated with a minimum amount of force and in which controlled matter is sealed from electrical control portions of the device.

The use of a control device to control a level of liquid or to operate a bellows lever or a flow responsive device has become widely accepted in industrial applications. In certain instances, it has been found that it is necessary to control the level of material by a device in which it is impossible for the material to come in contact with the inner working parts of the control device. It is readily apparent that where the level of a highly corrosive material, such as, sulphuric acid is controlled, it is particularly desirable to completely enclose the acid but still provide a means for controlling the level. It is also apparent that a minimum amount of force for the operation of the control device is desirable.

It is therefore a principal object of the instant invention to provide a control device in which the controlled matter may be completely sealed from the electrical portions of the control device.

It is another object of the hereindisclosed invention to provide a control device in which controlled matter is completely sealed from electrical portions of the control device and the control device may be readily adjusted to provide an appropriate range of levels of controlled matter.

It is a further object of the present invention to provide an electrical control device which has a long life and depends upon balance of masses for the operation of the device rather than springs to achieve a long uniform life for the device.

It is a still further object of this invention to provide a control device which has a snap action in the operation of controlling members without the use of springs to provide the snap action.

Other objects and uses of the present invention will become readily apparent to those skilled in the art upon a perusal of the accompanying specification in light of the drawings in which:

FIGURE 1 is a cross sectional view of a control device embodying the present invention showing a switch assembly in side elevation but with electrical leads removed for purposes of clarity;

FIGURE 2 is a cross sectional view of the control device shown in FIGURE 1 showing a pair of switch assemblies in cross section to illustrate the relation of parts of the switch assemblies;

FIGURE 3 is a partial cross sectional view of a portion of the device shown in FIGURE 1 showing the magnets of the device in plan view;

FIGURE 4 is a diagrammatic side elevation of three magnets in the device shown in FIGURE 1 and showing in dotted form the initial position of two of the magnets and a change in position of one of the magnets after a second magnet is moved relative to the first mentioned magnet;

FIGURE 5 is a diagrammatic side elevation of the three magnets of the device shown in FIGURE 1 but with a control magnet positioned in position to affect the third magnet of the device;

FIGURE 6 is an enlarged plan view of a mercury switch and switch holder of the device shown in FIGURE 1, and FIGURE 7 is a side elevation of one end of a fragment of a band which supports one of the mercury switches.

Referring now to the drawings and especially to FIGURE 2, it may be seen that a control device embodying the hereindisclosed invention and generally indicated by numeral 10 is shown therein. The device 10 generally includes a housing 12, a frame 14 mounted in said housing, a pair of terminal blocks 16 and 18 mounted on the frame, a pair of switch assemblies 20 and 22 mounted on the frame and a control magnet assembly 24 mounted in the housing to operate the switch assemblies as will be described hereinafter.

The housing 12 includes a base 26 which has an aperture 28 contained therein with a tube 30 mounted in the aperture. The base also includes a conduit outlet 32 which is conventional in its construction. A cover 34 is sealingly attached to the base 26 to complete the housing.

Mounted on the base 26 is the frame 14. The frame 14 includes a pair of wall panels 36 and 38. The wall panel 36 includes a pair of mounting edges 40 and 42 and the construction of panel 38 is identical to the panel 36. The panel 38 has an identical pair of mounting edges, one of which edges 44 may be seen in FIGURE 1, though the other edge is not shown in this instance.

As was mentioned above, the switch assemblies 20 and 22 are mounted on the frame 14 and the two switch assemblies have identical construction. The switch assembly 20 is attached to the mounting edges of panels 36 and 38 by a mounting plate 46 and a friction plate 48 which plates are held together by screws 50 which arrangement allows the position of the switch assembly to be adjusted by merely loosening screws 50 and sliding the entire switch assembly. It should be noted that the friction plate 48 is made of a magnetic material to provide a snap action for the switch assembly as will be described hereinafter. The mounting plate 46 contains a shaft aperture 52 which has mounted therein a horizontal shaft 54. The shaft 54 has an enlarged body 56 in its center which provides a means for positioning the shaft. The shaft 54 has a reduced switch bearing end 58 on one end of the shaft, and a magnet bearing end 60 on the other end of the shaft. Pivotedly mounted on the switch bearing end of the shaft is a switch support 62. The switch support 62 includes a pivot ear 64 which pivotedly engages the switch support end 58. Formed integral with the pivot ear is a mounting plate 66 which is perpendicular to the pivot ear and which has formed integral therewith a switch plate 68 through which passes the shaft 54. The switch plate is perpendicular to the mounting plate and has a pair of switch tangs 70 formed integral therewith a complete the switch support.

A conventional mercury switch 72 is removably connected to the switch support by a switch holder 74. The switch holder 74 includes a switch bracket 76 which bracket includes a bracket support 78 which is fixed to the switch plate by means of a conventional rivet. Formed integral with the bracket support is a bracket arm 80 which is perpendicular to the bracket support. The bracket arm has a plurality of mounting notches 82 formed therein for holding in position a switch band 84. The switch band 84 is a flexible metallic band which has an aperture 86 positioned in one end adjacent to the bracket support. The band 84 wraps around the mercury switch 72 as may be seen in FIGURE 2 to define a generally U-shaped band and to hold the mercury switch in engagement with the tangs 70. The other end of the band 84 has a T-shaped slot 86. As may be seen in FIGURE 7, the wider portion of the slot 86 easily receives the bracket arm 80 and the band may be slid along the arm 80 to an appropriate position for locking the band to the arm.

The band may be locked to the arm by positioning the band in one of the notches 82 of the arm. The cantilever construction of the arm 80 allows the free end of the arm to be depressed to accommodate the band 84. Upon release of the arm by an operator the resilience of the arm 80 raises the switch into engagement with the tangs 70 and holds the switch in secure engagement to the switch support.

The switch assembly 20 is completed by a horseshoe magnet 88 and a magnet support 90. The magnet support 90 includes a support panel 92 which is fixed to the switch plate by means of a screw 94. The support panel 92 has an aperture contained therein which pivotedly receives the magnet end 60 of shaft 54 so that the magnet support freely pivots on the shaft. Formed integral with the support panel 92 is an angle plate 96 and formed integral with the angle plate is a magnet mount 98 which is perpendicular to the plane of the support panel 92 and parallel to the mounting plate 66. The magnet 88 is positioned between the mounting plate 66 and the magnet mount 88 and is held therein by a bolt 100 which extends through the magnet and the magnet mount and mounting plate. The bolt is held in position by a conventional nut 102.

The mercury switch 72 is conventional in its construction and it has three leads which are not shown in this instance and those leads are connected to the terminal block 16 in a conventional fashion.

As was mentioned above, switch assembly 22 is identical in construction to the above-described switch assembly 20. Inasmuch as the construction of the two assemblies is identical, the suffix a shall be added to all of the numerals of the parts in switch assembly 22 which parts are identical in their construction to like parts of switch assembly 20. For a detailed explanation of the interrelation of the various parts reference to the construction of switch assembly 20 is hereby incorporated. The mercury switch 72a is connected in a conventional fashion to its terminal block 18 by three ordinary electrical leads which are not shown in this instance for purposes of clarity.

The control device 10 is completed by a sealing means mounted within the housing 12. The sealing means includes an elongated tube 104 which is sealingly connected to a conventional container of material (not shown) and positioned in aperture 28 in a vertical attitude. The tube 104 has one end within the housing 12 sealed closed by a plug 106, which plug also acts as a stop means for the control magnet assembly and the other end is open to permit free movement of a connecting rod 108. The connecting rod 108 is pivotedly connected to the control magnet assembly which includes a non-magnetic carrier 110 with a bar magnet 112 positioned therein. It should be noted that the tube 104 is also made of a non-magnetic material for reasons which will become apparent hereinafter. The other end of the connecting rod 108 is connected to a suitable float or other actuating means which is not shown. It is apparent that an electric conduit may be positioned in opening 32 in base 26 and electrical leads are connected to terminals 16 and 18 as may be desired. This connection is made in a conventional manner and is not shown or described herein since the connections are well-known.

The operation of control device 10 is described in detail hereinafter. Looking now to FIGURE 4 which shows the normal attitude of horseshoe magnets 88 and 88a when the bar magnet 112 is positioned a sufficient distance from the two horsehouse magnets so as not to affect the horseshoe magnets, i.e., magnet 88a and the bar magnet are shown in dotted form. As is evident in FIGURE 4, the horseshoe magnets in their normal attitude are tilted against the force of gravity so that the respective mercury switches are positioned in a given active attitude.

When the bar magnet 112 is brought into a position where the bar magnet is adjacent to magnet 88a, the magnet 88a then tilts in the opposite direction as shown in solid form in FIGURE 4. It should be not that, inasmuch as friction bar 48 is made of a magnetic material, the tilting of the magnet is a snap action. The snap action is accomplished by appropriate positioning of the bar magnet relative to magnet 88a. Magnet 88a does not tilt until both poles of the magnet are in a position to be affected by the single pole of the bar magnet. It is apparent that when both poles of magnet 88a are affected, there is a doubling of the force applied to it. It may be readily appreciated that, as the magnet 88a changes position, it pivots about shaft 54 so that the magnet support and the switch support also pivot about the same shaft. Thus, the mercury switch 72a is also pivoted to shift mercury in the switch from one end of the switch to the other to provide a different electrical contact. As the bar magnet 112 moves upward toward the magnet 88 as shown in FIGURE 5, the magnet 88 tilts downward when it comes into the magnetic field of the bar magnet to the attitude shown. Thus, the switch 72 is then affected and a change in electrical circuit is effected. As the bar magnet 112 moves downward, the effect of the bar magnet on the horseshoe magnets is the reverse, as described herein. By using a bar magnet and spacing the horseshoe magnets a sufficient distance apart it is evident that a double action of the instant device may be effected.

It is readily apparent that the mercury switches which are connected to terminal blocks may be connected to any given electrical source to control such items such as valves, motors, solenoids or even relays. Thus, the position of the control rod may be used to level a particular device or to keep a certain level of liquid in a given device.

The construction of the control device 10 is such that it may be used to control levels for highly corrosive materials. It is only necessary to provide a non-corrosive tube 104 with a non-corrosive plug 106 plugging one end of the tube and a non-corrosive connecting rod 108 moveably mounted in the tube. The carrier 110 for the bar magnet 112 is also made of a non-corrosive material. The electrical portions of the instant control device are completely sealed from the portion cooperative with the connecting rod 108.

It should also be further noted that the present device may be used in a very dusty atmosphere as long as the cover 34 of the housing is sealed to base 26 and the aperture 32 through which leads to the terminals enter the housing has a seal around the leads to prevent dust from entering the housing. Thus, the precision moving portions of the instant control device may be hermetically sealed so that the device may be used in practically any atmosphere.

As was mentioned above, inasmuch as the switch assemblies are held onto the frame by friction between the mounting plate and the friction plate, it is necessary only to loosen screws 50 which provide a screw means for locking the friction plate and mounting plate together to move the entire switch assembly along the frame. Thus, it is a simple matter to adjust the spacing between the two magnets 88 and 88a and a wide range of control may be attained by a very simple manipulation of loosening the bolts and moving the entire switch assembly.

Another aspect of the present invention is that the mercury switches may be readily removed from their particular switch assemblies and they may readily be replaced by other types of mercury switches as desired. As is obvious from the above discussion it is only necessary to force the bracket arm downward toward the mercury switch so that the band may be lifted out of the notches 82 and the band then has one end which may be slipped off the bracket arm. Thus, the mercury switch may be readily removed and replaced.

The switching action of the mercury switch is easily reversible by reversing the poles of the horseshoe magnet in its supports in the event that a single throw switch is provided. One horseshoe magnet can provide two pole switching action for electrical circuits by removing the horseshoe magnet from a second mechanism, replacing it with a non-magnetic coupling engaging the horseshoe magnet of the first mechanism, and mounting the two mechanisms on the same level back-to-back. These mechanisms can also be used to actuate a flag or indicator and a micro-switch or micro-switches may be substituted for mercury switches when suitable brackets are supplied. Micro-switches are necessary on traction, marine and severely vibrating installations.

From the foregoing description it is evident that the arrangement of the present device is such to provide an optimum effectiveness for all of the parts. The bar magnet is straddled by each of the horseshoe magnets when the bar magnet is in a working position. When the bar magnet is in a working position with one of the horseshoe magnets, the magnetic action between the two magnets is nearly doubly effective since one pole of the bar magnet repels one pole of the horseshoe magnet and attracts the opposite pole of the same horseshoe magnet. This "push-pull" action produces almost twice the force ordinarily found in prior art devices having magnets of a similar size and with less friction in the bearings. This action also produces quicker switch action with less travel of the horseshoe magnet resulting in closer control of the medium being controlled. The mercury switch or other control device being balanced evenly about the shaft results in a minimum actuating force being required from the mediums being controlled. The present arrangement produces the proper force necessary to operate the switch or other control device and overcome the effect of the friction and the force between the magnet and the magnetically attractive plate. Therefore, a reversal of the direction of movement of rod 108 is accomplished with lesser force than with prior art devices.

Although a specific embodiment of the present invention has been shown and described in detail above, it is to be expressly understood that those skilled in the art may make various modifications and changes without departing from the spirit and the scope of the present invention. The present invention is limited only by the appended claims.

What is claimed is:

1. A control device comprising, in combination, a housing having a base and a cover, a frame mounted on the base within said housing, a mounting plate engageable with said frame, a friction plate being made of magnetic material engageable with said frame and being spaced from the mounting plate to receive a portion of the frame between the friction plate and the mounting plate, screw means releasably engageable with the friction plate and the mounting plate to hold the friction plate and the mounting plate in frictional engagement with the frame, a shaft mounted in the mounting plate, a switch support pivotedly mounted on the shaft to pivot about an axis in a substantially horizontal plane, a magnet support pivotedly mounted on the shaft and being fixed to the switch support, a permanent horseshoe magnet fixed to the magnet support and the switch support, a tang being a portion of the switch support, a switch bracket fixed to the switch support, a resilient bracket arm being a portion of the switch bracket and having a plurality of notches therein, said bracket arm being substantially parallel to the shaft, a switch band removably connected to the bracket arm, said switch band having an aperture in one end for receiving the resilient arm and a T-shaped aperture in th other end for receiving the resilient arm and mating with a pair of selected notches in the bracket arm to lock the switch band into position, a generally cylindrical mercury switch in engagement with the switch band and held by the switch band in engagement with the tang by the resilience of the resilient bracket arm to operate with pivoting of the magnet about the shaft, a nonmagnetic tube extending into the housing positioned in said base adjacent to the horseshoe magnet in a substantially vertical attitude, a plug in one end of the tube within the housing to seal closed the tube within the housing, a nonmagnetic magnet carrier slideably mounted in said tube, a control rod connected to the magnet carrier to control the position of said magnet carrier, and a permanent bar magnet positioned in the magnet carrier for controlling the attitude of the horseshoe magnet to operate the mercury switch, whereby movement of the bar magnet into the field of a pole of the horseshoe magnet causes the horseshoe magnet to snap into another position through the combined effects of the bar magnet and the friction plate.

2. A control device comprising, in combination, a housing having a base and a cover, a frame mounted on the base within said housing, a mounting plate engageable with said frame, a friction plate being made of magnetic material engageable with said frame and being spaced from the mounting plate to receive a portion of the frame between the friction plate and the mounting plate, screw means releasably engageable with the friction plate and the mounting plate to hold the friction plate and the mounting plate in frictional engagement with the frame, a shaft mounted on the mounting plate, a switch support pivotedly mounted on the shaft to pivot about an axis in a substantially horizontal plane, a magnet support pivotedly mounted on the shaft and being fixed to the switch support, a permanent horseshoe magnet fixed to the magnet support, a mercury switch mounted on the switch support to operate with the pivoting of the magnet about the shaft, a nonmagnetic tube extending into the housing positioned in said base adjacent to the horseshoe magnet in a substantially vertical attitude, and a permanent bar magnet movably mounted in the tube for controlling the attitude of the horseshoe magnet to operate the mercury switch, whereby movement of the bar magnet into the field of the horseshoe magnet causes the horseshoe magnet to snap into another position through the combined effects of the bar magnet and the friction plate.

3. A control device comprising, in combination, a housing having a base, a frame mounted on the base within said housing, a mounting plate attached to said frame, a permanent horseshoe magnet having a pair of spaced opposite poles pivotedly connected to the mounting plate to pivot about an axis which axis is in a substantially horizontal plane, a mercury switch connected to the permanent horseshoe magnet to pivot about the same axis as the permanent horseshoe magnet and to operate by the pivoting of the magnet, a non-magnetic tube positioned adjacent to and between the opposite pole pieces of the permanent horseshoe magnet in a substantially vertical attitude, and a permanent bar magnet movably mounted in the tube for controlling the attitude of the horseshoe magnet to operate the mercury switch, whereby movement of the bar magnet into the field of the horseshoe magnet causes the horseshoe magnet to change position and to operate the mercury switch by simultaneous cooperation of the opposite pole pieces with the bar magnet.

4. A control device comprising, in combination, a base, a frame connected to said base, a magnet pivotedly attached to said frame, a plate being of magnetic material connected to said frame and being adjacent to the magnet for magnetic coupling with the magnet to hold the magnet in one or two operable positions, a mercury switch connected to the magnet to be operated by the positioning of the magnet, a second magnet movably mounted in a rectilinear path adjacent to the first-mentioned magnet, whereby movement of the second magnet into the field of the first-mentioned magnet causes the first-mentioned magnet to snap into another position through the combined effects of the second magnet and the plate to operate the mercury switch.

5. A control device comprising, in combination, a base, a frame mounted on said base, a switch support pivotedly attached to said frame, a magnet support fixed to said switch support, a magnet fixed to the magnet support, a tang being a portion of the switch support, a switch bracket fixed to the switch support, a resilient bracket arm being a portion of the switch bracket and having a plurality of notches therein, a switch band removably connected to the bracket arm, said switch band having an aperture in one end receiving the resilient arm and a T-shaped aperture in the other end for receiving the resilient arm and mating with a pair of selected notches in the bracket arm to lock the switch band into position, a mercury switch in engagement with the switch band and held by the switch band in engagement with the tang by the resilience of the resilient bracket arm to operate with pivoting of the magnet, and a permanent magnet movable in a path adjacent to the first-mentioned magnet to selectively change the attitude of the first-mentioned magnet to operate the mercury switch.

6. A switch assembly for use in a control device comprising a mounting plate, a shaft positioned in said mounting plate, a pivot ear pivotedly connected to said shaft, a switch mounting plate being formed integral with and substantially perpendicular to said pivot ear, a switch plate being formed integral with and substantially perpendicular to the switch mounting plate, a pair of switch tangs being formed integral with and substantially perpendicular to the switch plate, a support panel pivotedly engaging the shaft and being fixed to the switch plate, an angle plate being formed integral with the support panel, a magnet mount being formed integral with the angle plate and being spaced from and parallel to the switch mounting plate, a magnet positioned between the magnet mount and the switch mounting plate and being fixed thereto, a bracket support being fixed to the switch plate, a resilient bracket arm being formed integral with and substantially perpendicular to the bracket support, said bracket arm having a plurality of pairs of mounting notches, an elongated thin switch band having a mounting aperture adjacent to one end receiving the resilient bracket arm and a T-shaped aperture adjacent to one end receiving the free end of the resilient bracket arm and mating with a selected pair of notches to lock the switch band to the resilient arm, and a mercury switch positioned between the switch band the pair of tangs, said mercury switch being held in engagement with the tangs by the resilience of the resilient bracket arm to hold the mercury switch in place.

7. A switch assembly for use in a control device comprising, in combination, a mounting plate, a magnet support pivotedly connected to the mounting plate, a magnet attached to said magnet support, a switch support attached to the magnet support for moving with the magnet support, a switch bracket attached to said switch support and having a resilient bracket arm, said bracket arm having a plurality of mounting notches, a switch band having an aperture in one end for receiving the bracket arm and a T-shaped aperture in the other end for receiving the bracket arm and mating with a selected notch to lock the switch band into position, and a mercury switch held into engagement with the switch support by the switch band to pivot the mercury switch relative to the mounting plate by movement of the magnet.

8. In a switch assembly for mounting a mercury switch the combination comprising, a switch plate, a pair of switch tangs extending outwardly from the switch plate, a switch bracket positioned between the switch tangs, said switch bracket including a resilient bracket arm having a plurality of mounting notches therein, and an elongated switch band having a mounting aperture in one end receiving the bracket arm and being positioned adjacent to the switch plate and an irregular aperture adjacent to the other end spaced away from the switch plate and receiving the bracket arm and mating with a notch on the bracket arm to lock the switch band to the bracket arm.

9. A control device comprising, in combination, a housing having a base and a cover, a frame mounted on the base within said housing, a nonmagnetic tube extending into the housing within said frame in a substantially vertical attitude, a plug in one end of the tube within the housing to seal closed the tube within the housing, a first mounting plate engageable with said frame, a friction plate being made of magnetic material engageable with said frame and being spaced from the mounting plate to receive a portion of the frame between the friction plate and the mounting plate, first screw means releasably engageable with the first friction plate and the first mounting plate to hold the first friction plate and the first mounting plate in frictional engagement with a portion of the frame, a first shaft mounted on the first mounting plate, a first switch support pivotedly mounted on the shaft to pivot about an axis in a substantially horizontal plane, a first magnet support pivotedly mounted on the shaft and being fixed to the first switch support, a first permanent horseshoe magnet fixed to the first magnet support and the first switch support having its poles adjacent to and straddling the tube, a first tang being a portion of the first switch support, a first switch bracket fixed to the first switch support, a first resilient bracket arm being a portion of the first switch bracket and having a plurality of notches therein, said first bracket arm being substantially parallel to the first shaft, a first switch band removably connected to the first bracket arm, said switch band having an aperture in one end for receiving the resilient arm and a T-shaped aperture in the other end for receiving the resilient arm and mating with a pair of selected notches in the first bracket arm to lock the first switch band into position, a generally cylindrical first mercury switch in engagement with the first switch band and held by the switch band in engagement with the first tang by the resilience of the resilient bracket arm to operate with pivoting of the first magnet about the first shaft, a first terminal block mounted on the frame within the housing, means connecting the first mercury switch and the first terminal block, a second mounting plate engageable with said frame, a second friction plate being of magnetic material engageable with said frame and being spaced from the second mounting plate to receive a portion of the frame between the second mounting plate and the second friction plate, second screw means releasably engageable with the second friction plate and the second mounting plate to hold the second friction plate and the second mounting plate in frictional engagement with the frame, a second shaft mounted in the second mounting plate, a second switch support pivotedly mounted on the second shaft to pivot about an axis in a substantially horizontal plane, a second magnet support pivotedly mounted on the second shaft and being fixed to the second switch support, a second permanent horseshoe magnet fixed to the second magnet support and the second switch support having its poles adjacent to and straddling the tube, said second permanent horseshoe magnet having a like pole adjacent to a like pole of the first permanent horseshoe magnet, a second tang being a portion of the second switch support, a second switch bracket fixed to the second switch support, a second resilient bracket arm being a portion of the second bracket and having a plurality of notches therein, said second bracket arm being substantially parallel to the second shaft, a second switch band removably connected to the second bracket arm, said second switch band having an aperture in one end for receiving the second resilient arm and a T-shaped aperture in the other end for receiving the second resilient arm and mating with a pair of selected notches in the second bracket arm to lock the second switch band into position, a generally cylindrical second mercury switch in engagement with the second switch band and held by the second switch band in engagement with the second tang by the resilience of the second resilient bracket arm to operate with pivoting of the second magnet about the second shaft, a second terminal block mounted on the frame, a second means for electrically connecting the second mercury switch with the second terminal block, a nonmagnetic magnet carrier slideably mounted in said tube, a control rod connected to the magnet carrier to control the position of said magnet carrier, a permanent bar magnet positioned in said magnet carrier for controlling the attitude of the permanent horseshoe magnets to operate the respective mercury switches, whereby movement of the bar magnet into the field of one of the horseshoe magnets causes the hourseshoe magnet to snap into another position through the combined effects of the bar magnet and the respective friction plate.

10. A control device comprising, in combination, a housing having a base and a cover sealingly attached to said base, a frame mounted on the base within the housing, a nonmagnetic tube extending into the housing in a substantially vertical attitude, a plug in one end of the tube within the housing to seal closed the tube within the housing, a first mounting plate engageable with said frame, a first friction plate being of magnetic material engageable with said frame and being spaced from the first mounting plate to receive a portion of the frame between the first friction plate and the first mounting plate, first screw means releasably engageable with the friction plate and the mounting plate to hold the friction plate and the mounting plate in a selected position by frictional engagement with the frame, a first shaft mounted in the first mounting plate, a switch plate pivotedly mounted on the shaft, a switch tang formed integral with the switch plate and being substantially perpendicular to the switch plate, a switch mounting plate formed integral with the switch plate and being substantially perpendicular to the switch plate, a pivot ear being formed integral with the switch mounting plate and being in pivotal engagement with the shaft, a support panel being fixed to the switch plate, an angle plate formed integral with the support panel, a magnet mount being formed integral with the angle plate and being substantially perpendicular to the support panel, a permanent horseshoe magnet being fixed to the magnet mount and the switch mounting plate to pivot about the shaft, a switch bracket including a bracket support fixed to the switch plate and a bracket arm having a plurality of mounting notches, said bracket arm being substantially parallel to the shaft, a switch band removably connected to the bracket arm, said switch band having an aperture in one end receiving the resilient arm and a T-shaped aperture in the other end for receiving the resilient arm and mating with a pair of selected notches in the bracket arm to lock the switch band into position, a generally cylindrical mercury switch in engagement with the switch band and held by the switch band in engagement with the tang by the resilience of the resilient bracket arm to operate with the pivoting of the permanent magnet about the shaft, a second mounting plate engageable with said frame, a second friction plate being made of magnetic material engageable with said frame and being spaced from the second mounting plate to receive a portion of the frame between the second friction plate and the second mounting plate, second screw means releasably engageable with the second friction plate and the second mounting plate to hold the second friction plate and the second mounting plate in a selected position by frictional engagement with the frame, a second shaft mounted in the second mounting plate, a second switch plate pivotedly engaging the second shaft, a second switch tang formed integral with the second switch plate and being substantially perpendicular to the second switch plate, a second switch mounting plate formed integral with the second switch plate and being substantially perpendicular to the second switch plate, a second pivot ear pivoted engaging the second shaft and being formed integral with and perpendicular to the second switch mounting plate, a second support panel being fixed to the second switch plate, a second angle plate being formed integral with the second support panel, a second magnet mount being formed integral with the second angle plate and being perpendicular to the second support panel, a second permanent horseshoe magnet fixed to the second magnet mount and the second switch mounting plate, said second permanent horseshoe magnet having its poles adjacent to and straddling the nonmagnetic tube, a second switch bracket having a second bracket support fixed to the second switch plate and a second resilient bracket arm having a plurality of notches therein, said second bracket arm being substantially parallel to the second shaft, a second switch band removably connected to the second bracket arm, said second switch band having an aperture in one end receiving the second resilient arm and a T-shaped aperture in the other end for receiving the second resilient arm and mating with a pair of selected notches in the second bracket arm to lock the second switch band into position, a generally cylindrical second mercury switch in engagement with the second switch band and held by the switch band in engagement with the second tang by the resilience of the second resilient bracket arm to operate with the pivoting of the second permanent magnet about the second shaft, a nonmagnetic magnet carrier slideably mounted in said tube, a control rod pivotedly connected to the magnet carrier to control the position of said magnet carrier, and a permanent bar magnet positioned in said magnet carrier for controlling the attitude of the horseshoe magnets to operate the respective mecury switches, whereby movement of the bar magnet into the field of one of the horseshoe magnets causes the horseshoe magnet to snap into another position through the combined effects of the bar magnet and the respective friction plate.

11. A control device comprising, in combination, a frame, a magnet movably mounted on the frame, said magnet having a pair of spaced opposite poles, control means connected to the magnet for operation by the attitude of said magnet, and a second magnet movably mounted in a path passing adjacent to the pair of spaced opposite poles of the first mentioned magnet to attract and to repel, simultaneously, the opposite poles of the first mentioned magnet to affect the position of said first mentioned magnet thereby controlling the operation of said control means.

References Cited by the Examiner
UNITED STATES PATENTS

| | | | |
|---|---|---|---|
| 2,292,648 | 8/42 | Moore | 200—112 |
| 2,298,573 | 10/42 | Little | 200—87 |
| 2,521,723 | 9/50 | Hubbell | 200—87 |
| 2,671,834 | 3/54 | Kmiecik | 200—84 |

BERNARD A. GILHEANY, *Primary Examiner.*

ROBERT K. SCHAEFER, *Examiner.*